United States Patent [19]
Zettl et al.
[11] 3,764,738
[45] Oct. 9, 1973

[54] METHOD AND ARRANGEMENT FOR LIMITING THE OUTPUT SIGNAL AMPLITUDE OF A VIDEO AMPLIFIER DURING FLY-BACK HIGHLIGHT DISCHARGE

[75] Inventors: Herbert Zettl, Erfinder; Emil Siegel, Erfelden, both of Germany
[73] Assignee: Fernseh GmbH, Darmstadt, Germany

[22] Filed: Feb. 15, 1973
[21] Appl. No.: 226,442

[52] U.S. Cl. .......................178/7.2 R, 178/DIG. 29
[51] Int. Cl. ..........................................H04n 5/38
[58] Field of Search .................178/7.2 R, DIG. 29

[56] References Cited

UNITED STATES PATENTS

| | | | |
|---|---|---|---|
| 3,445,590 | 5/1969 | Dischert et al. | 178/DIG. 29 |
| 3,652,792 | 3/1972 | Usagawa | 178/7.2 R |
| 3,102,924 | 9/1963 | Legler | 178/DIG. 29 |
| 3,389,221 | 6/1968 | MacDonald | 178/DIG. 29 |
| 3,392,236 | 7/1968 | Nielsen et al. | 178/DIG. 29 |
| 3,407,268 | 10/1968 | Sennhenn | 178/7.2 R |
| 3,414,667 | 12/1968 | Tanner | 178/DIG. 29 |
| 3,518,371 | 6/1970 | Brooks | 178/7.2 R |
| 3,651,255 | 3/1972 | Kubota et al. | 178/7.2 R |

*Primary Examiner*—Paul L. Henon
*Assistant Examiner*—Melvin B. Chapnick
*Attorney*—Michael S. Striker

[57] ABSTRACT

A method and apparatus for amplifying television picture signals. The amplified television picture signals from an amplifier are monitored by a circuit arrangement including a Zener diode. When the amplitude level of the amplified signals exceeds a predetermined value, the Zener diode becomes conductive and an auxiliary signal is generated. A normally high resistance semi-conductor arrangement is connected in parallel with the high resistance in the input circuit of the amplifier. The semi-conductor arrangement is normally non-conductive, and in such cases, the effective load impedance at the input of the amplifier is substantially equal to the high resistance. When the auxiliary signals are applied to the semi-conductor arrangement, the latter becomes conductive to thereby provide a substantially lower resistance in the input circuit of the amplifier. In the latter case, the voltage levels developed at the input of the amplifier are limited, to thereby limit the amplitude of the amplified signals at the output of the amplifier.

14 Claims, 3 Drawing Figures

METHOD AND ARRANGEMENT FOR LIMITING THE OUTPUT SIGNAL AMPLITUDE OF A VIDEO AMPLIFIER DURING FLY-BACK HIGHLIGHT DISCHARGE

BACKGROUND OF THE INVENTION

The present invention involves a circuit arrangement for amplifying a picture signal from a picture pick-up tube such as, for example, used in a television camera. More particularly, the present invention involves a circuit for amplifying such signals while preventing the output amplified signals from exceeding a predetermined value.

Accurate television transmission is made difficult by the utilization of certain television camera pick-up tubes. Thus, for example, difficulties are encountered with the so-called highlight areas which commonly occur in pick-up tubes of the Plumbicon type. The Plumbicon tube is a special type of vidicon tube with a lead-oxide target. Thus, while such a tube has certain advantages, it suffers, like all vidicon tubes from a somewhat softer picture. The general operation of such tubes is well known. For example, see Reference Data for Radio Engineers, fifth Edition, 1968, pages 16–46. Thus, it is known that areas of positive potential will form on the inner side of a vidicon tube which faces the beam in response to bright scenes or highlights. Because of the inherent construction of such vidicon tubes, the charge conditions of the inner side of the tube facing the beam are not restored to their normal levels immediately after the highlights are removed. This feature of such tubes, especially in brightly lit scenes or in fast moving scenes, tends to cause a deterioration of the picture quality.

It has been known, for example, to adjust the beam intensity as a function of the scene highlights in order to minimize these effects. The beam must have adequate intensity to discharge the highlight elements of the photoconductor surface to the cathode potential on each scan. When insufficient beam current is provided, the highlight elements will not be sufficiently discharged and consequently the picture highlights will all appear to have the same relative amplitude and a washed-out picture with little detail in the highlight areas will result. For this reason, beam intensities have been raised to minimize this problem.

Insufficient beam currents also permit the interior of the screen to gradually charge to nearly the full target potential. This occurs because the highlighted target areas are not returned to the cathode potential during each scan and they resume charging at a somewhat higher potential after each passage of the beam. When the highlight illumination is removed, it takes several passages of the beam to completely discharge those areas affected. As a result, the remaining charge causes an image to be produced for a period of time after the illumination is reduced and the high-brightness areas tend to stick. When viewing a bright moving object, this condition causes a white tailing or smearing effect to be observed at its trailing edge. This is sometimes known as the comet-tail effect.

Thus, although it is important to provide sufficient beam current, it should also be noted that too much beam intensity will increase the size of the scanning spot, and a loss of resolution will result. This is sometimes called the Blooming-effect.

It has been known, to decrease these difficulties caused by highlights, to discharge the highlighted areas of the television pick-up tube during the fly-back or return trace of the scanning beam with very large scanning currents. Such a method or mode of operation of the television pick-up tube is known as "anti-comet-tail" operation, which is sometimes abbreviated as the ACT-operation. This mode of operation is also sometimes known as the "fly-back highlight discharge," which is sometimes abbreviated and represented by "FHD." During these ACT-operations, the maximum signal current occurring during the fly-back or the return scan can be in the order of magnitude of 500 fold the normal or mean signal currents occurring during normal scanning. In this manner, the beam currents during normal scanning can be kept at reasonable levels without causing the "Blooming effect" while the highlighted areas can be effectively discharged during the fly-back so as to prevent the "anti-comet-tail effect."

However, the use of the ACT-operation has caused a still further problem which has manifested itself at the output of the video amplifiers. Thus, the very high intensity beam current during the fly-backs have caused high voltage levels to be generated at the inputs of the video amplifiers, and consequently very high output amplified voltages at the output of said amplifiers. Because of the inherent time constants associated with the circuitry, the outputs of the video amplifiers do not recover immediately after the termination of the fly-back and video signals from successive scans may thereby be blocked out and lost.

SUMMARY OF THE INVENTION

Accordingly, it is an object of the present invention to provide a method and apparatus for amplifying television picture signals which do not possess the disadvantages known in the prior art.

It is another object of the present invention to provide a method and apparatus for amplifying television picture signals which are simple and economical to use and which can be utilized with vidicon tubes.

It is still another object of the present invention to provide a method and apparatus for amplifying television picture signals which prevents the amplified signals from exceeding a predetermined level.

It is a further object of the present invention to provide method and apparatus for amplifying television picture signals which insure that no video signal information will be lost as a result of ACT-operation.

It is also an object of the present invention to provide a method and apparatus for amplifying television picture signals which is particularly useful in connection with amplifying video signals from vidicon tubes, for example, Plumbicon tubes when operated in ACT-operation.

According to the present invention a method of producing and amplifying television picture signal includes monitoring the amplitude of said signals. The method also comprises the step of regulating the amplitude of the signals to be amplified so that the amplitude of the amplified signals do not appreciably exceed a predetermined value.

More particularly, the amplified signals are compared with a predetermined value. When the amplified signals exceed the predetermined value, auxiliary signals are generated which have the result of limiting the amplitude of the television signals prior to amplification. By limiting the amplitude of the signals prior to amplification, it is assured that the amplified signals do not exceed said predetermined value. Also, while the present method and apparatus are useful for limiting all excursions of the output signals from the amplifier above the predetermined value, it is particularly contemplated that the high input signals at the amplifier, which can be caused by the high beam intensity during fly-back, are to be reduced during the retrace scans of the television camera.

The apparatus for carrying out the above method, generally comprises means for generating a sequence of television picture signals. Amplification means having input means for amplification of said television picture signals and output means for transmitting the amplified television picture signals is provided. Monitoring means is provided which is associated with one of said input and output means for monitoring the amplitude levels of the signals at said respective latter means, said monitoring means generating auxiliary signals in response to the signals at the means associated with said monitoring means exceeding a predetermined value. Regulation means is provided for regulating the signals at said input means in response to the generation of said auxiliary signals to control the former signals. In this manner, amplified television picture signals do not appreciably exceed said predetermined value. According to one preferred embodiment, the regulation means comprises a pair of series connected diodes which together are connected in parallel with the input resistance to the amplifier, while in a second presently preferred embodiment, the source-drain path of a field-effect transistor is connected in parallel with the input resistance. In each case, when the output signals at the output of the amplifier attain the predetermined value, an auxiliary signal is generated which causes the parallel connected elements to become conductive and to thereby decrease the effective input resistance at the input to the amplifier. With the decreased resistance at the input to the amplifier, the higher currents passing therethrough caused by the higher beam intensities during retrace scans do not generate the high voltages which would cause the amplified signals to exceed the predetermined value.

Thus, by the utilization of circuitry of the type described in connection with an amplifier of a picture signal of a television pick-up tube, the disturbances caused by the high beam currents during the return scans are decreased. As noted above, these disturbances are substantially eliminated by the provision of a low resistance path at the input of the amplifier where the current from the output signal electrode of the tube flows through.

Thus, to solve these problems in the amplification of television picture tube signals delivered to an amplifier, the amplitude of the amplified signal is monitored and, by going over a preselected signal value, an auxiliary signal is generated. The auxiliary signal is transmitted to the output electrode of the television tue, to which the regulation means is likewise connected, so that a rise of the amplified signal beyond the threshold or predetermined level prevents any further rise in the input signal at the input to the amplifier.

Advantageously, with the utilization of a vidicon tube, a circuit arrangement is provided which carries the operation D.C. voltage to the signal electrode of the television pick-up tube through a high resistance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2, 3:
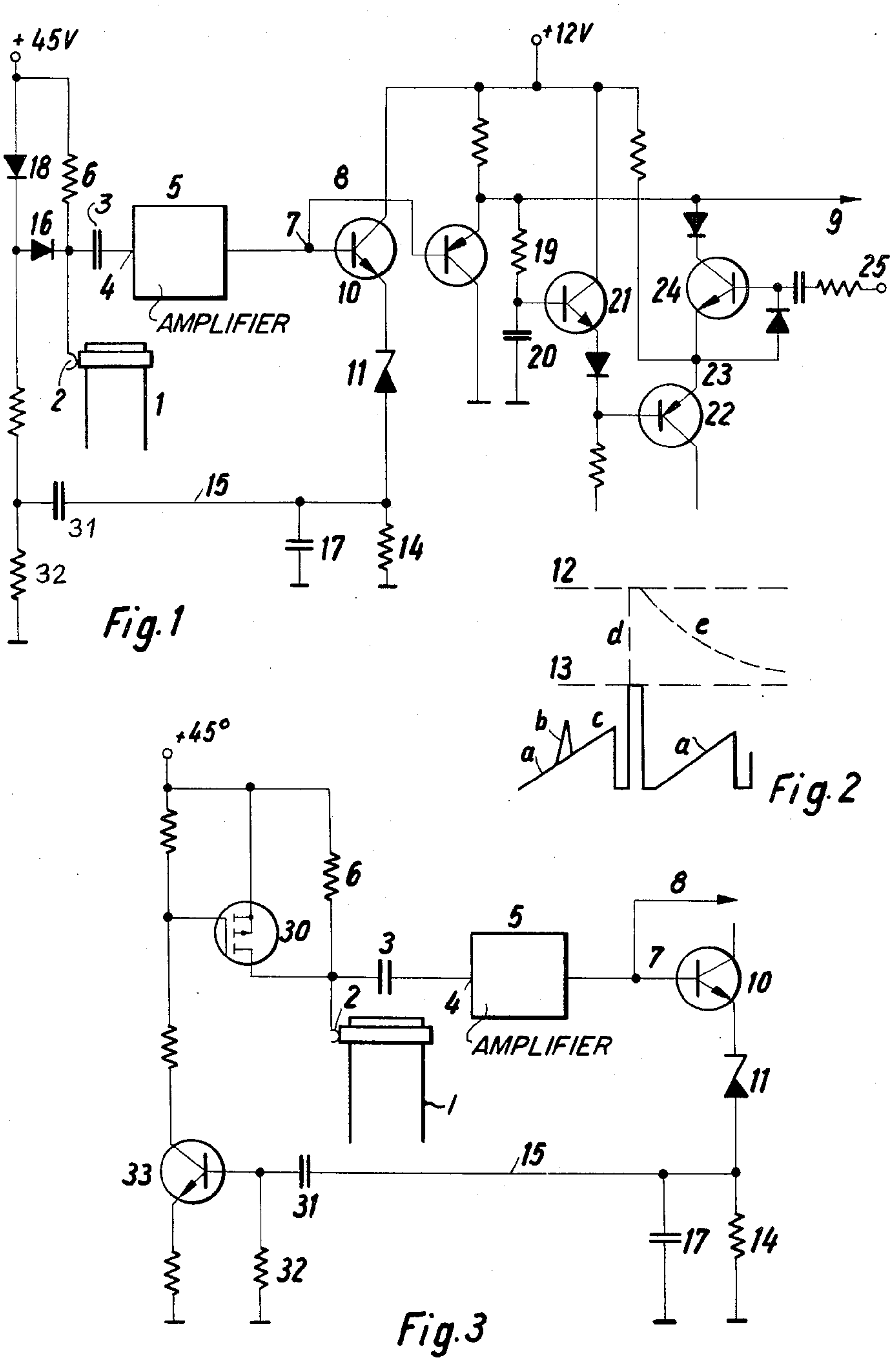
FIG. 1 is a schematic diagram of a circuit arrangement using diodes to limit the amplitude of the signals at the input of the amplifier of the present invention.
FIG. 2 is a diagram showing waveforms at the output of the amplifier of FIG. 1.
FIG. 3 is a circuit diagram of an alternate embodiment of the present invention, utilizing a field effect transistor.

Referring now to the drawings, and particularly FIG. 1, a television pick-up tube 1 is shown of the Plumbicon-type. The pick-up tube 1 generates an electrical video signal of a known type. The video signal appears at the signal electrode 2, said signal being coupled through the capacitor 3 to the input 4 of the amplifier 5. Although the present invention will be described in connection with the Plumbicon tube, it will become clear from a reading of the present disclosure that this invention can be utilized with other types of pickup tubes, particularly all classes of vidicon tubes.

A relatively high resistance 6 (typically 4 megohm) is connected between a positive voltage source (here +45 volts) and the signal electrode 2 to provide the operating D.C. target voltage to the pick-up tube 1.

The amplifier 5 has an output 7 where the amplified picture signals are transmitted over the conductor 8 for further processing. At the output 7, a transistor 10 is provided which has its emitter connected to a Zener diode 11. The base of the transistor 10 is connected to the output 7 of the amplifier 5.

An exemplary signal output from the amplifier output 7 is shown schematically in FIG. 2. For simplicity the video signal here is assumed to be a triangularly formed curve, which is generally designated by the reference letter *a*. The wave form shown in FIG. 2 is shown to be somewhat periodic, the triangular wave form *a* repeating, the intermediate portion representing the fly-back or retrace scan time in which the scanning beam returns to its normal starting position before scanning the next successive set of points on the screen of the Plumbicon tube. The video signal, or picture content, includes a brightness or highlight point generally designated by the reference letter *b* and shown to be a spike or a peak in the video portion of relatively high amplitude. Also, a comparable peak or highlight is generally designated by the reference letter c.

During the fly-back or return trace, when the ACT-operation is utilized, the scanning rays are substantially increased in intensity from the normal beam intensity, as described above. When the return scan beam intercepts charged areas on the screen which correspond in position to places where highlights have been exposed, very high signal currents are generated, the latter passing through the high resistance 6. The thus generated substantially higher excursions at the signal electrode 2 are generally designated by the dashed curve represented by the letter *d*.

The dashed curve *d* represents the amplitude or shape of the voltages that would be generated at the signal electrode 2 under normal ACT-operation. Thus, the curve *d* is shown to increase to the maximum level 12 which the amplifier 5 can generate. However, after the amplifier has thus been driven into saturation, even after the return scan, and, therefore, the high input levels of the amplifier are removed, the signal at the output 7 continues to persist, as shown by the curve generally designated by the reference letter *e*. Such a curve is generally the result of the amplifier time constants as well as that of the associated circuitry. With such an arrangement, as hitherto known in the art, some of the useful video signals would be lost because they are blocked out by the decaying voltage at the output 7 and this persists until the curve *e* has decayed so that the video signals again may be distinguished at the output 7. This recovery time interval may be equal to several scan periods.

To prevent this effect from occuring, a monitoring arrangement comprising the transistor 10 with the Zener diode 11 is provided. Although the monitoring arrangement is to be described below in connection with the output 7 of the amplifier 5, it will become clear that similar arrangements may be utilized to monitor the signals appearing at the input 4 directly. When the amplified signals cross over a predetermined threshold value, which in FIG. 2 is shown by the dashed line 13, the Zener diode 11 is made conductive and a pulse is directed to the resistance 14 (typically equal to 2 kilohm). Of course, if the input signals are monitored directly, then the threshold level 13 must be decreased by a value equal to the gain of the amplifier 5 so that when the critical valued signals at the input 4 are amplified, the maximum valued output signals will not exceed the level 13. A pulse is transmitted over the conductor 15 as an auxiliary signal to the anode of the diode 16. The cathode of the diode 16 is connected to the signal electrode 2. The capacitor 17 serves to smoothen out the flanks of the pulse in a well-known way.

The diodes 16 and 18 are connected in series, and bridge the high ohm resistance 6, and thereby serve, during the fly-back for the ACT-operation, a low resistance path for the required high current of the signal electrode 2. Namely, through a proper choice of the Zener diode 11, the amplitude of the pulse applied to diode 16 can be chosen so that during the period of the auxiliary signal or the pulse which serves to close the diode 16, the higher potential applied to the diode is also applied to the signal electrode 2 of the television pick-up tube 1. More particularly, when a positive pulse of sufficient amplitude is applied to the anode of the diode 16, the anode becomes more positive than the cathode thereof, the latter being connected to the signal electrode 2, and the diode 16 becomes forward conducting. In this condition, the effective resistance of the diode 16 is very small and the signal electrode 2 current which would normally flow through the high resistance 6 can now flow through the diode 16. Although the same current can flow through either the resistance 6 or the diode 16, the voltage developed across the latter is substantially smaller than that which would be developed across the former with the same current flowing therethrough, this effectively limiting or clamping the voltages at the input to the amplifier 5.

In this manner, during the period of the auxiliary signal or the pulse applied to the diode 16, the potential of the output electrode cannot continue to grow as shown by the durve d in FIG. 2 but rather is limited once it reaches the threshold or predetermined value 13. This, as explained above, is achieved by limiting the level of the signal at the input 4 of the amplifier 5, this effective control being such that the input signal is limited to a value which when amplified by the amplifier 5 will yield the output voltage having a maximum value equal to the predetermined level generally designated by the potential 13.

To make the circuit still more effective, and more particularly to remove the residual errors, a resistance 19 and a capacitor 20 are connected in series to form an integration circuit. This integration circuit is utilized to provide a further auxiliary signal which is transmitted through a first impedance changing stage, namely transistor 21, and a second impedance changing stage, namely transistor 22, so that a voltage which is a function of the further auxiliary signal is applied to circuit point 23. The integration circuit is connected to output 7 of amplifier 5, the integration circuit integrating the output signal, typically shown in FIG. 2, to obtain the time average value thereof. Point 23 of the circuit is connected to output lead 9 by means of a switching transistor 24 as shown. At the base of the transistor 24 a terminal 25 is provided where pulses are applied during the fly-back or the retrace scans. In this manner, only during the fly-back time, a positive voltage is applied to the transistor 24 to thereby make the same conductive. By making the transistor 24 sufficiently conductive, the voltage at the lead 9 takes on the value of the voltage at point 23. With such a circuit arrangement, during the fly-back period, the output signals are clamped at the average value of the output signal.

Referring now to FIG. 3, this Figure shows a similar circuit arrangement as that shown in FIG. 1 with a slight modification. Thus, the signal electrode 2 of the pick-up tube 1, which was originally shown to be connected to the diodes 16 and 18, is now connected to the source of voltage through a field effect transistor 30. Only a portion of the circuitry in FIG. 1 is reproduced in FIG. 3, the rest of the circuitry being the same. The same elements which serve the same function in both Figures have been represented by the same reference numerals.

The field effect transistor 30 as shown is a p-channel enhancement type MOS field effect transistor. This transistor 30 is utilized as a switching transistor in the circuit shown. In this arrangement, the control voltage from the transistor 10 and the Zener diode 11 is applied over the conductor 15 to the capacitor 31 and the resistance 32 comprising a R-C arrangement. The R-C arrangement is connected to the base of the transistor 33. The collector of the transistor 33 is connected to the gate of the field effect transistor 30. As is well known, a p-channel enhancement type field effect transistor is normally non-conductive between the source-drain path and it becomes conductive only upon the application of a relatively negative going voltage which is applied to the gate. Now, during the fly back or return trace of the beam, the source-drain path of the field effect transistor is made conductive, the conductivity becoming very low in response to the application of the auxiliary signal to the base of the transistor 33. Under this condition, the transistor 33 becomes saturated and the collector thereof drops from its initially high positive potential. As before, the source-drain path of the field effect transistor 30 effectively shunts the high impedance of the resistance 6, whereby the high currents passing through the electrode 2 and the field effect transistor 30 do not produce the very high input voltages to the amplifier 5 which would otherwise be formed were the current to be directed through the resistance 6.

It has been shown that with both of the prior described circuit arrangements, the output errors at the video amplifiers can be corrected, this being useful to also correct for color errors. In any event, the present circuitry may be utilized with both black and white as well as with color television cameras.

It will be understood that each of the elements described above, or two or more together, may also find a useful application in other types of amplifying apparatus differing from the types described above.

While the invention has been illustrated and described as embodied in a method and apparatus for amplifying television picture signals, it is not intended to be limited to the details shown, since various modifications and structural changes may be made without departing in any way from the spirit of the present invention.

Without further analyses, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

We claim:

1. In a television camera having a pick-up tube having a determined sensitivity and having a signal electrode for furnishing television picture signals, and amplifier means having an input connected to said signal electrode and an output for furnishing amplified television picture signals corresponding to said television picture signals, a method for limiting the amplitude of said amplified television picture signals to a predetermined maximum amplitude while maintaining said determined sensitivity of said pick-up tube, comprising, in combination, the steps of furnishing an auxiliary signal when said amplitude of said amplified television picture signals exceeds said predetermined maximum amplitude; and limiting the amplitude of said television picture signals at said signal electrode to an amplitude corresponding to said predetermined maximum amplitude in response to said auxiliary signal, while maintaining said sensitivity of said pick-up tube substantially constant.

2. A method as set forth in claim 1, wherein said step of creating an auxiliary signal comprises monitoring said amplified television picture signals and creating said auxiliary signal when the amplitude of said amplified television picture signals exceed said predetermined maximum amplitude.

3. A method as set forth in claim 2, wherein said television picture signals have retrace intervals; wherein said pick-up tube is operated with fly-back highlight discharge, whereby said television picture signals have signal peaks substantially exceeding said amplitude corresponding to said predetermined maximum amplitude during said retrace intervals; and wherein creating said auxiliary signal comprises creating said auxiliary signal in response to said signal peaks.

4. In a television camera, a signal limiting arrangement, comprising, in combination, a pick-up tube having a determined sensitivity and having a signal electrode for furnishing a television pick-up signal having retrace intervals; amplifier means having an input connected to said signal electrode and having an output for furnishing amplified television picture signals corresponding to said television picture signals; monitoring means connected to said amplifier means for furnishing an auxiliary signal when the amplitude of said amplified television picture signals exceeds a predetermined maximum amplitude; and regulation means connected to said monitoring means and said input of said amplifier means, for preventing an increase of amplitude of signals at said input in response to said auxiliary signal, independent of said sensitivity of said pick-up tube.

5. An arrangement as set forth in claim 4, wherein said monitoring means are connected to said output of said amplifier means, for monitoring said amplified television picture signals.

6. An arrangement as set forth in claim 5, further comprising a source of D.C. voltage for providing an operating voltage to said signal electrode; and resistance means connecting said source of D.C. voltage to said signal electrode.

7. An arrangement as set forth in claim 6, wherein said regulation means are diode means connected in parallel to said resistance means, and connected to said monitoring means in such a manner that said diode means furnish a shunt path for said resistance means upon receipt of said auxiliary signal.

8. An arrangement as set forth in claim 7, wherein said diode means comprise a first diode having an anode connected to receive said auxiliary signal and a cathode connected to said signal electrode, and a second diode connected in series to said first diode.

9. An arrangement as set forth in claim 7, wherein said regulation means comprises semi-conductor means connected in parallel with said resistance means, and connected to said monitoring means in such a manner that said semi-conductor means is normally non-conductive and changes to the conductive state upon receipt of said auxiliary signal.

10. An arrangement as set forth in claim 9, wherein said semi-conductor means comprise a field-effect transistor having a source-drain circuit connected in parallel with said resistance means and having a gate connected to said monitoring means for receiving said auxiliary signal.

11. An arrangement as set forth in claim 5, wherein said monitoring means comprise a transistor having a base connected to said output of said amplifier means, and having an emitter and a collector; a Zener diode having a first terminal connected to said emitter, and a second terminal; and circuit means connected to said second terminal, for furnishing said auxiliary signal.

12. An arrangement as set forth in claim 11, wherein said circuit means comprise a resistance-capacitance circuit.

13. An arrangement as set forth in claim 5, further comprising additional amplification stages connected to said output of said amplifier means for further amplifying said amplified television picture signals.

14. An arrangement as set forth in claim 5, further comprising means for furnishing a signal corresponding to the average value with respect to time of said amplified television picture signals; wherein said arrangement has an output; further comprising means for connecting said signal to said output during said retrace intervals.

* * * * *

UNITED STATES PATENT OFFICE
CERTIFICATE OF CORRECTION

Patent No. 3,764,738 Dated October 9, 1973

Inventor(s) Herbert Zettl et al.

It is certified that error appears in the above-identified patent and that said Letters Patent are hereby corrected as shown below:

On the cover sheet [73] Assignee: "Fernseh GmbH, Darmstadt, Germany" should read -- Robert Bosch Fernsehanlagen Gesellschaft mit beschraenkter Haftung, Darmstadt, Germany --.

Signed and sealed this 27th day of August 1974

(SEAL)
Attest:

McCOY M. GIBSON, JR.
Attesting Officer

C. MARSHALL DANN
Commissioner of Patents